April 2, 1957

A. N. RADER 2,787,209

WIENER ROASTER

Filed Sept. 15, 1954

INVENTOR
*Albert N. Rader*

BY *Merle C. Kissinger*
ATTORNEY

April 2, 1957 — A. N. RADER — 2,787,209
WIENER ROASTER
Filed Sept. 15, 1954 — 5 Sheets-Sheet 2
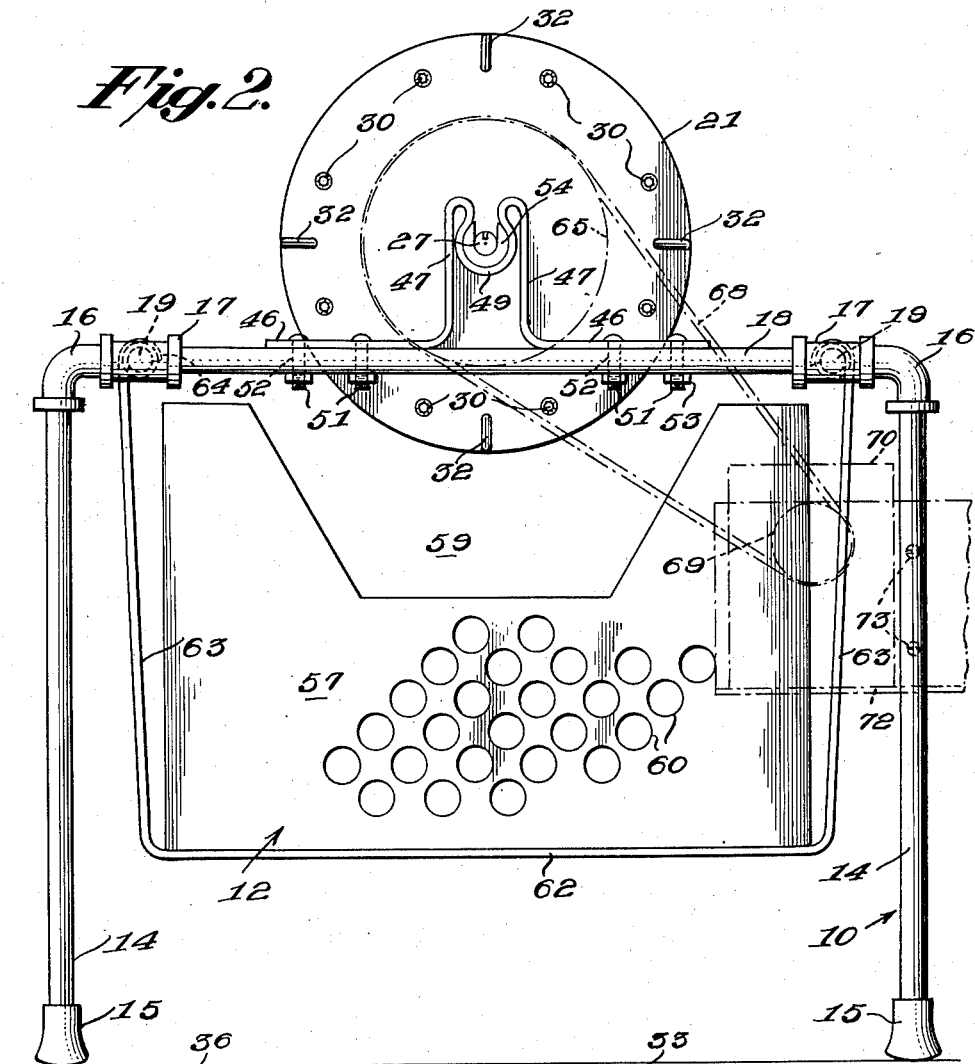
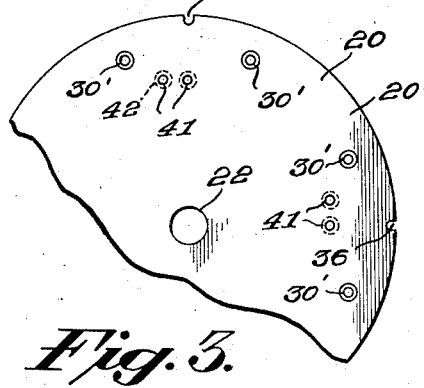
INVENTOR
Albert N Rader
BY Merle C. Kissinger
ATTORNEY

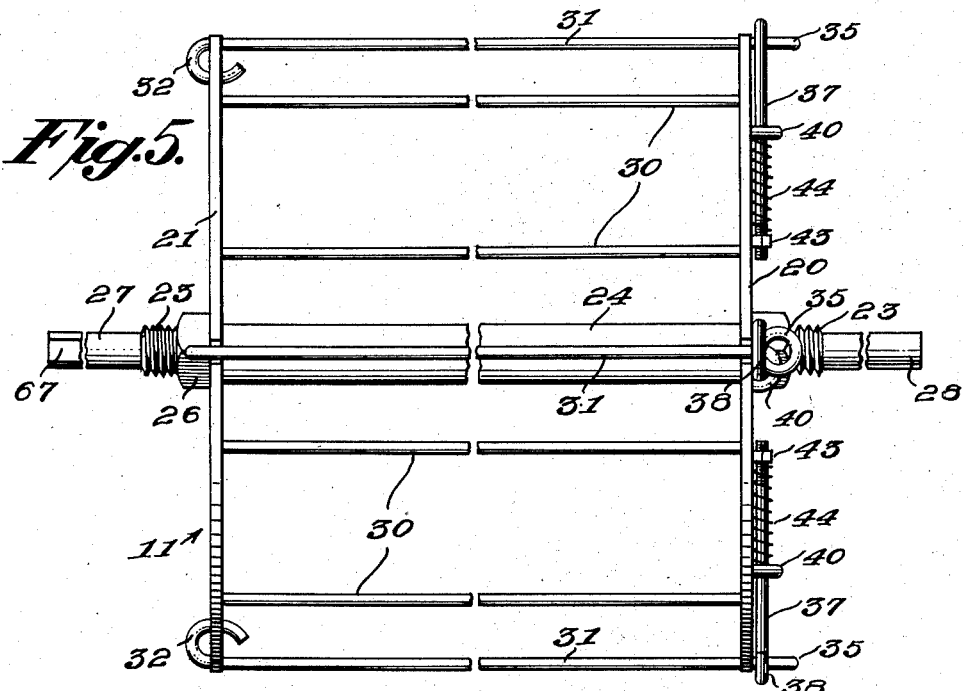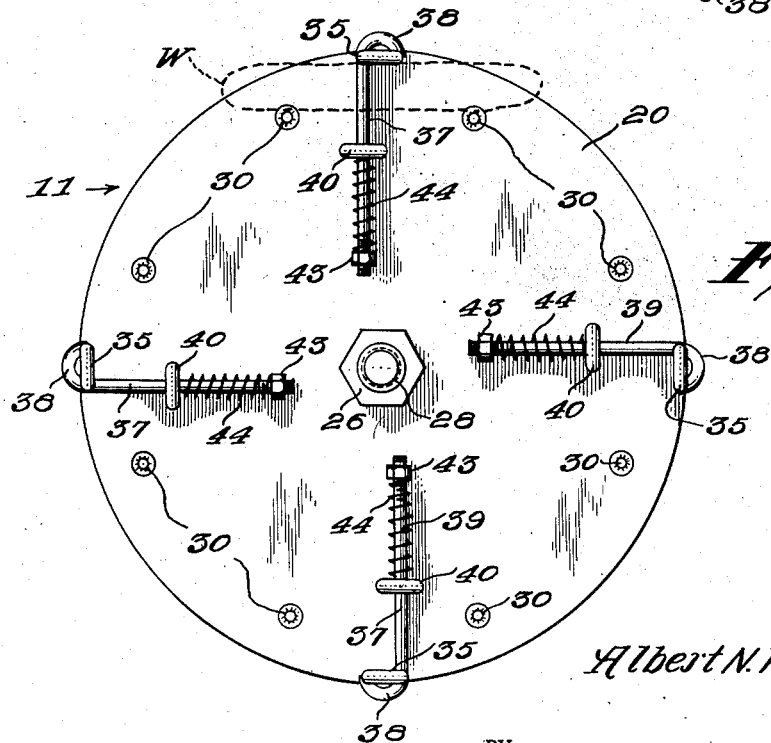

April 2, 1957  A. N. RADER  2,787,209
WIENER ROASTER

Filed Sept. 15, 1954  5 Sheets-Sheet 4

INVENTOR
Albert N. Rader
BY Merle C. Kissinger
ATTORNEY

April 2, 1957 A. N. RADER 2,787,209
WIENER ROASTER
Filed Sept. 15, 1954 5 Sheets-Sheet 5
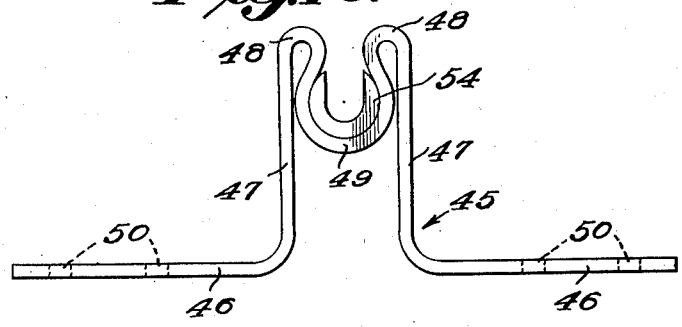
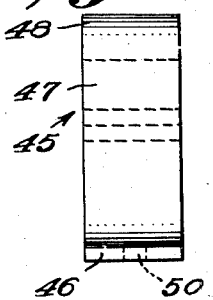
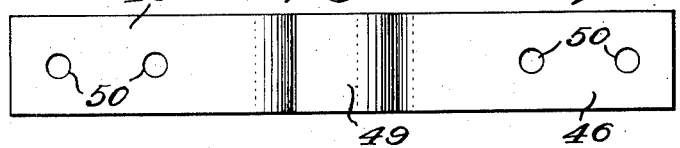
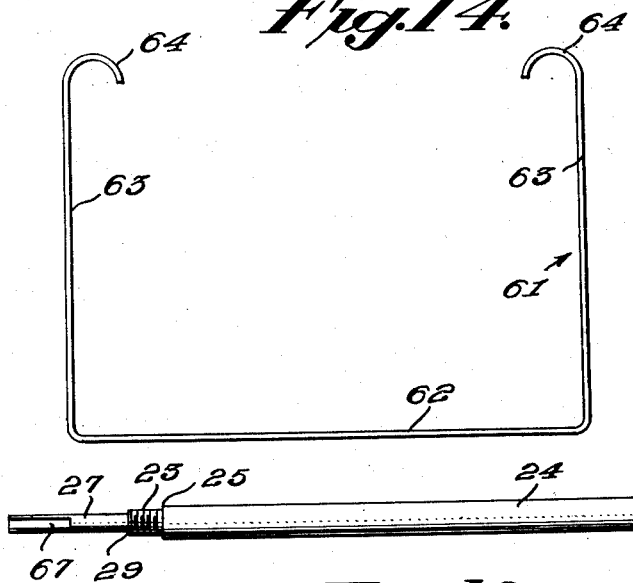
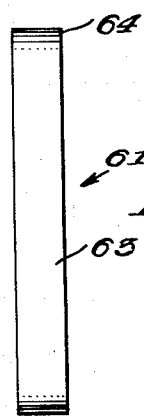
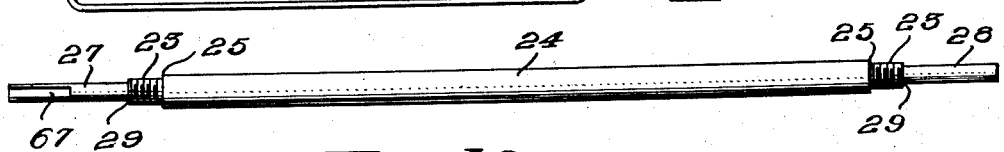
INVENTOR
Albert N. Rader
BY Merle C. Kissinger
ATTORNEY United States Patent Office 2,787,209
Patented Apr. 2, 1957

2,787,209

WIENER ROASTER

Albert N. Rader, Fostoria, Ohio, assignor of one-half to Opal L. Kathrans, Adrian, Mich.

Application September 15, 1954, Serial No. 456,159

9 Claims. (Cl. 99—427)

This invention relates to a wiener roaster.

The invention is more particularly concerned with a wiener roaster of a portable type and which is generally characterized in the inclusion of a frame, a fire box supported by the frame and a generally cylindrical wiener supporting cage rotatably supported by the frame and above the fire box supported thereby.

A primary object of the invention is to provide a wiener roaster of the above noted general character which is compact in structure, highly efficient in operation and which provides for quick and easy positioning of wieners into roasting position and their removal therefrom.

A further and more specific object of the invention is to provide a wiener roaster including a frame, a fire box, and a rotatable generally cylindrical wiener supporting cage, the frame including upright supported opposite side members and opposite end members, and wherein the fire box is removably supported by the side members in depending relation thereto and wherein the cage is removably supported by the end members in surmounting relation thereto.

A still further object of the invention is to provide a wiener roaster including a frame, a fire box supported by a frame in depending relation thereto, a wiener supporting cage rotatably supported by the frame and power drive means for the cage including a shaft which is freely removable with the cage as a unit upon lifting same vertically upwardly.

A still further object of the invention is to provide a wiener roaster including a generally cylindrical wiener retaining cage including a circumferential series of parallel longitudinally extending rods arranged in pairs thereof and a second series of rods with one thereof radially outwardly of each pair of said first rods, and wherein the rods of each of said pairs thereof provide for substantial line contact with wieners adjacent their opposite ends, and each of said second rods yieldably engaging the wieners in substantial line contact on the opposite sides thereof intermediate their ends whereby the rods removably retain the wieners in roasting position with substantially their entire outer surfaces exposed to the action of heat.

Other objects and advantages of the invention will become apparent in the course of the following detailed description, taken in connection with the accompanying drawings, wherein—

Fig. 2 is an end elevational view as observed from the left of Fig. 1 and with the drive means shown in dot-and-dash lines for greater clarity of other essential elements.

Fig. 3 is a fragmental outside elevational view of one of the cage end plates.

Fig. 4 is a similar view of the opposite cage end plate.

Fig. 5 is a broken and foreshortened elevational view of a wiener supporting cage involved in the roaster construction.

Fig. 6 is an end elevational view of the cage as observed from the right of Fig. 5.

Fig. 10 is an end elevational view of a shaft supporting bracket involved in the construction.

Fig. 11 is a side elevational view of the bracket.

Fig. 12 is a bottom plan view of the bracket.

Fig. 13 is a side elevational view of a bearing bushing which is shown in end elevation in operative association with the bracket in Fig. 10.

Fig. 14 is an end elevational view of a fire box hanger.

Fig. 15 is a side elevational view of the hanger.

Fig. 16 is a side elevational view of a cage supporting shaft.

Figure 1:
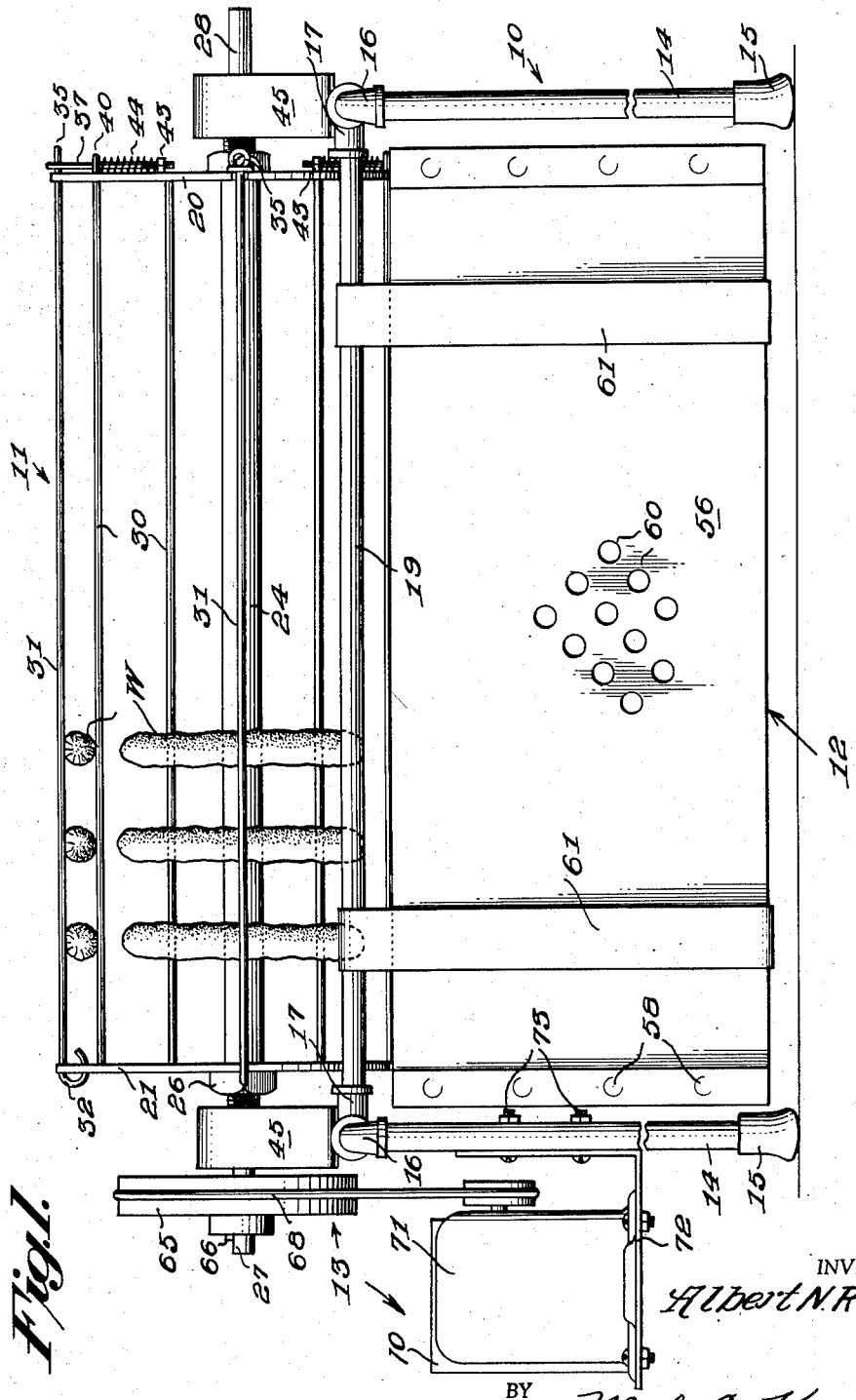
Fig. 1 is a broken side elevational view of the improved wiener roaster in accordance with a preferred structural embodiment thereof.
Figure 7:
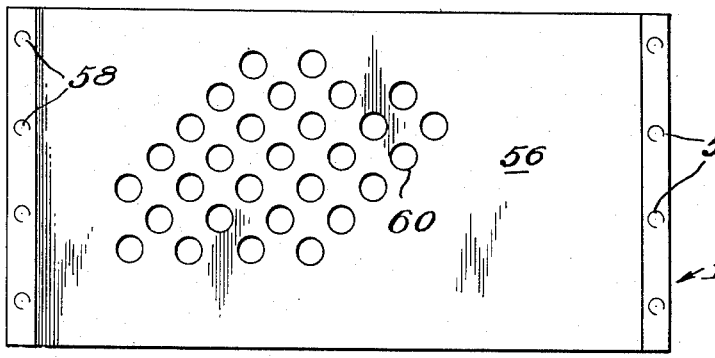
Fig. 7 is a side elevational view of a fire box involved in the roaster construction.
Figure 8:
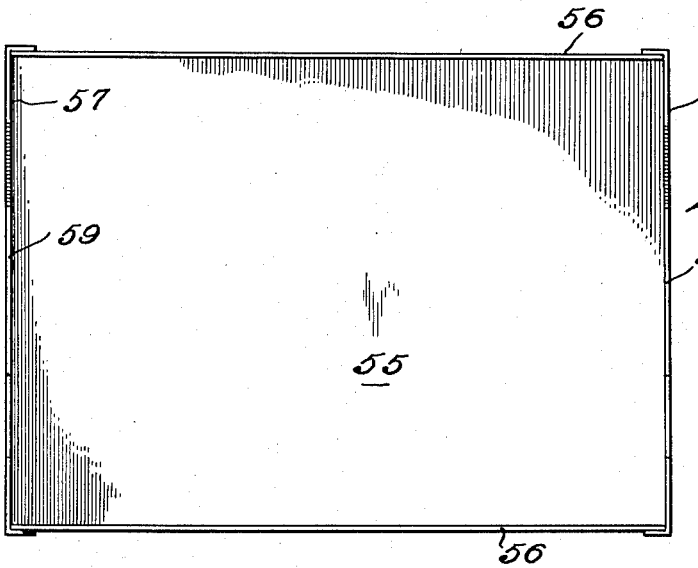
Fig. 8 is a top plan view of the fire box.
Figure 9:
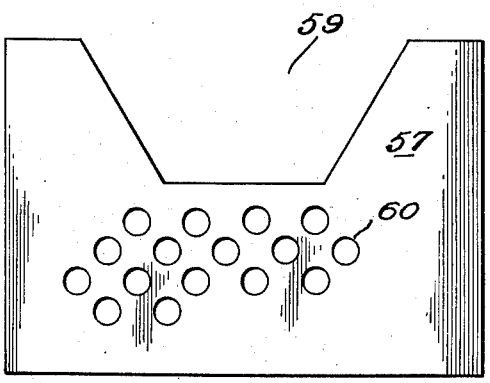
Fig. 9 is an end elevational view of the fire box.

Referring now in detail to the drawings, the roaster construction comprises in general a frame 10, a wiener supporting cage 11 rotatably supported on an axis disposed above the top of the frame, a fire box 12 disposed within the frame and suspended from the top thereof and power drive means 13 supported by the frame.

The frame 10 is of generally rectangular form and is conveniently constructed from ⅛" pipe and suitable L and T couplings.

The frame includes in its construction four corner vertical uprights 14 whose lower ends are preferably provided with suitable cup form feet 15 which may be of resilient material.

The frame 10 further includes an L-coupling 16 at the upper end of each vertical upright 14 and each L-coupling is engaged with one end of a T-coupling 17.

The heads of the T-couplings extend transversely of the frame and the stems thereof extend longitudinally of the frame and the axes of said stems are inwardly displaced from the vertical planes of the upright 14. A transversely disposed pipe section 18 has its opposite ends connected to the heads of each transversely aligned pair of T-couplings and the axes of such pipe sections are in the vertical planes of the axes of the upright 14.

A longitudinally disposed pipe section 19 has its opposite ends connected to the stems of each opposite side pair of T-couplings 17 and the axes of sections 19 are in vertical planes disposed inwardly of the vertical planes of the uprights 14 as is obvious from inspection of Fig. 2.

While as above stated, the frame is preferably constructed of pipe sections, the invention is not limited thereto and the frame may be properly defined as comprising four corner vertical frame sections, and two side and two end horizontal sections connected to the upper ends of the vertical sections.

The wiener retaining cage 11 comprises a pair of opposite end discs 20 and 21 which are provided with central axially aligned apertures 22 which receive the threaded sections 23 adjacent the opposite ends of a shaft 24 (Fig. 16) and the discs 20, 21 are drawn up against shoulders 25 on the shaft by means of nuts 26.

The shaft 24 includes opposite end portions 27 and 28 of less diameter than threaded portions 23 thereby providing shoulders 29 for a purpose later to appear.

The discs 20 and 21 are connected by means of a plurality (eight as shown) of rods or bars 30 whose opposite ends are disposed within countersunk apertures 30¹ in the discs and the ends of the rods are preferably drilled and the material surrounding the drilled openings is peened over into the countersinks as is indicated by the small radial lines in Figs. 2 and 6.

The rods 30 cooperate with means now to be described for releasably holding the wieners individually in position for a roasting operation. Such means in a preferred structural embodiment thereof comprise a plurality (four as shown) of rods or bars 31, corresponding ends of which are provided with hooks 32 and as indicated in Fig. 4 the disc 21 is provided with peripheral notches 33 in which the bars 31 rest at points adjacent the hooks 32 and the hooks extend through apertures 34 radially inwardly of the notches 33 whereby the bars 31 are capable of being swung radially outwardly from their opposite ends.

At this point it is to be observed that each bar 31 cooperates with a pair of rods 30 for holding a plurality of wieners W which, as indicated in Fig. 1, are disposed transversely of shaft 24 and are disposed in spaced relation longitudinally of the shaft.

The opposite ends of bars 31 are provided with eyes 35 which are in planes at right angles to the planes of hooks 32 and the disc 20 is provided with peripheral notches 36 in which the bars adjacent the eyes 35 are loosely and movably disposed.

The bars 31 are movably retained in the notches 36 by means of retainer bars 37 which are substantially radially disposed on the outer face of disc 20 and whose radially outer ends are provided with hooks 38 which engage over the corresponding ends of bars 31 adjacent the bases of the eyes 35.

The shanks 39 of the retainer bars 37 are radially movable in yokes 40 which are of U shape and whose legs project through apertures 41 in disc 20 and which apertures are countersunk on the inner face of the disc as indicated at 42 in Fig. 3 for peening over of the ends of the legs of the yoke 40.

The inner ends of the retainer bars 37 are threaded and engaged by nuts 43 and coil springs 44 surround the bars 37 with their opposite ends bearing on the yokes 40 and the nuts 43 and the tension of said springs is adjustable by threading the nuts in one or another direction axially of the shanks of the retainer bars 37. Thus the yieldably resisted bars 37 maintain the bars 31 in normal position and with the movable ends thereof seated in the notches 36.

The bars 31 are, however, capable of being moved radially outwardly for facilitating the placement of wieners between same and pairs of rods 30 and for removal of the wieners after a roasting operation.

From the above description it will be seen that the cage 11 is a unit with the shaft 24 by which the cage is rotatably mounted in a manner now to be described.

A bracket 45 (Figs. 1, 2, 10, 11 and 12) is supported on each frame section or member 18 and each bracket comprises an elongated strip of strap steel which is bent to provide a pair of foot portions 46, a pair of laterally spaced vertical portions 47, inwardly curved portions 48 and a central bearing portion 49.

The foot portions 46 are provided with apertures 50 through which are extended bolts 51 (Fig. 2) and which bolts extend through apertures 52 in the frame members 18, the bolts being provided with nuts 53 for firmly connecting the brackets 45 to the frame.

A diametrically open bearing bushing 54 is disposed within and brazed to each bearing portion 49.

It will be observed from Fig. 10 that the inwardly curved bracket portions 48 are laterally spaced in substantial conformity with the opening in the bushing 54 for admitting the bearing end portions 27, 28 of the shaft 24 and the shoulders 29 on the shaft engage the inner ends of the bearing bushings whereby the shaft is retained against axial movement.

The fire box 12 is constructed of sheet steel and same comprises a bottom wall 55, opposite side walls 56, and opposite end walls 57.

It will be observed that the box is constructed from a single sheet of material and the opposite side edges of the end walls 57 are lapped over the ends of the side walls 56 and spot welded thereto as indicated at 58.

The end walls 57 are provided with central cut-outs 59 in their upper portions for facilitating admission of fuel to the box. Furthermore, both the side and end walls are preferably perforated as indicated at 60 (only portions of such perforations being shown) for providing better draft.

The fire box 12 is suspended from the side members 19 of the frame by means of a pair of hangers 61 (Figs. 1, 2, 14 and 15) and which are formed from strap steel and bent into general U-form including a base 62 on which the fire box 12 is supported and opposite yielding legs 63 which terminate in curved portions 64 which engage over the frame members 19 as indicated in Fig. 2. It is to be noted that the length of base 62 is less than the lateral distance between the outer sides of frame members 19 whereby the legs 63 must be flexed in mounting the box and the reaction of the legs firmly holds the hangers 61 in assembled position, but same are capable of being readily removed upon further outward flexing thereof.

The drive means 13 comprise a relatively large pulley 65 which is removably secured to the bearing end 27 of the shaft 24 by means of a key 66 received within a keyway 67 in said shaft bearing end 27.

The pulley 65 is driven by a belt 68 (Fig. 2) which also engages a relatively small pulley 69 on a speed reducer 70 driven by a motor 71. The speed reducer 70 and motor 71 are secured to an L-bracket 72 which is secured to one of the frame uprights 14 as by bolts 73.

It will be observed from the above disclosure that the roasting structure is capable of expeditious manufacture in that substantially all parts thereof are fabricated from pipe, sheet metal and rods.

The roaster is of relatively small dimensions as will be appreciated from the fact that the frame 10 is approximately 18″ long. Nevertheless the structure has relatively large wiener capacity due to the structure of the novel cage 11 which is capable of retaining four circumferentially spaced longitudinal series of wieners W in roasting position and from Fig. 1 it will be apparent that each longitudinal series of wieners might well include from nine to twelve thereof.

In operation of the improved roaster structure, as above described, the cage 11 is loaded with wieners which is accomplished by lifting the spring influenced ends of rods 31 in succession and while the end of each such rod is lifted a series of wieners W are pushed lengthwise into position between such rod and a pair of fixed cooperating rods 30.

The spring 44 will act to retain the rods 31 in bearing contact with the wieners and since in each longitudinal series of wieners a pair of rods 30 have only substantially line contact with the wieners on one side thereof and adjacent their ends while a single rod 31 has only substantially line contact on the opposite side of the wieners and intermediate their ends, substantially the entire surfaces of the wieners will be exposed to heat from the fire box 12 which is positioned immediately below the cage.

With the fire box 12 provided with suitable ignited fuel, the wiener bearing cage 11 will be rotated through the drive means 13 and since the wieners in the rotation of the cage will have their entire surfaces uniformly subjected to heat from the fire box, same will not require turning thereof. However, the wieners of any and all longitudinal series thereof may be readily turned on their axes upon manually lifting the ends of rods 31 against the action of springs 44.

While the roasted wieners may be readily removed with the cage in operative position, the entire cage may be readily removed due to the open top bearings 54 either for loading or unloading of wieners. While the present structure is particularly adapted for roasting wieners, it is nevertheless applicable to the roasting of other similarly shaped objects.

While I have disclosed my invention in accordance with a single specific structural embodiment thereof, such is to be considered as illustrative only, and not restrictive, the scope of the invention being defined in the subjoined claims.

What I claim and desire to secure by U. S. Letters Patent is:

1. A rotatable cage for supporting wieners and the like over a source of heat in a roasting operation comprising a pair of parallel discs having central apertures, a shaft extending through said apertures and means for rigidly securing the discs to the shaft in predetermined axially spaced relation, a circumferential series of parallel rods traversing the space between said discs and having their opposite ends secured thereto, said rods providing a plurality of pairs thereof in equal circumferential spaced relation and with the rods of the several pairs in equal circumferentially spaced relation, a notch in the periphery of each disc centrally of the rods of each pair thereof, an aperture in one of said discs radially inwardly of each notch therein, a yoke on the outer face of the other disc radially inwardly of each notch therein, a wiener clamping rod cooperating with the first named rods of each pair thereof, said clamping rod having one end thereof seated in a notch in said one of said discs and said end terminating in a hook extending through the adjacent aperture in said one of the discs, the clamping rod being normally parallel with the rods of the associated pair thereof, the other end of said clamping rod normally resting in a notch of the other disc and terminating in an eye projecting beyond the outer face of such disc, a retainer bar radially slidable through a respective one of said yokes and having a terminal hook engaged over said eye, the inner end of said bar being threaded and provided with an adjustable nut, and a coil spring disposed between said yoke and said nut operative to yieldingly urge the clamping bar toward the associated pair of bars for clamping wieners and the like therebetween.

2. A roaster for wieners and the like, comprising a frame including vertical corner members having their upper ends connected to the opposite ends of opposed horizontal side members and opposed horizontal end members, a rectangular fire box disposed within the frame and supported by and in depending relation to said side members, a bearing bracket supported on each of said end members and projecting upwardly therefrom, a bearing in each of said brackets, a generally cylindrical wiener holding cage including a shaft axially thereof whose opposite ends are rotatably supported in said bearings, and power means for imparting rotation to said shaft and cage supported by one of said vertical corner members, said cage comprising opposed end discs, a pair of spaced wiener supporting rods disposed parallel with the axes of said discs and having their opposite ends connected thereto, said rods being equally spaced from the peripheries of said discs, and a wiener clamping rod disposed adjacent the peripheries of said discs and intermediate said first rods, said last rod having one end thereof pivotally connected to one of said discs, and yieldable means engaged with the other end thereof for urging same toward said pair of rods, the other of said discs being provided with a peripheral notch for receiving said other end of the clamping rod, said clamping rod terminating in an eye disposed outwardly of said other disc, and said yieldable means comprising a retainer bar supported for radial sliding movement on the outer face of said other disc and having an eye engageable hook on its upper end and a spring encircling said bar and urging same radially inwardly.

3. A roaster for wieners and the like, comprising a frame including vertical corner members having their upper ends connected to the opposite ends of opposed horizontal side members and opposed horizontal end members, a rectangular fire box disposed within the frame and supported by and in depending relation to said side members, a bearing bracket supported on each of said end members and projecting upwardly therefrom, a bearing in each of said brackets, a generally cylindrical wiener holding cage including a shaft axially thereof whose opposite ends are rotatably supported in said bearings, and power means for imparting rotation to said shaft and cage supported by one of said vertical corner members, said fire box being supported from said side members by means of a pair of generally U-shaped hanger members, each such member having a bight portion engaged with the bottom wall of said fire box, and opposite laterally yieldable leg members disposed adjacent the side walls of the box and the upper ends of said leg members having downwardly curved portions engaged over said frame side members.

4. The structure according to claim 3, wherein said bearing brackets each comprise an elongated metallic bent strip providing a pair of horizontal foot portions connected to an adjacent frame end member, a pair of spaced vertical portions, inwardly curved portions at the upper ends of said vertical portions, said last portions merging into a central open top bearing receiving portion, and said bearing having an open top for the purpose set forth.

5. A roaster for wieners and the like, comprising a frame including vertical corner members having their upper ends connected to the opposite ends of opposed horizontal side members and opposed horizontal end members, a rectangular fire box disposed within the frame and supported by and in depending relation to said side members, a bearing bracket supported on each of said end members and projecting upwardly therefrom, a bearing in each of said brackets, a generally cylindrical wiener holding cage including a shaft axially thereof whose opposite ends are rotatably supported in said bearings, and power means for imparting rotation to said shaft and cage supported by one of said vertical corner members, said cage comprising opposed end discs, a pair of spaced wiener supporting rods disposed parallel with the axes of said discs and having their opposite ends connected thereto, said rods being equally spaced from the periphery of said discs, and a wiener clamping rod disposed adjacent the peripheries of said discs and intermediate said first rods, said last rod having one end thereof pivotally connected to one of said discs, and yieldable means engaged with the other end thereof for urging same toward said pair of rods.

6. The structure according to claim 5, together with other sets of wiener engaging rods disposed between said discs.

7. A rotatable wiener supporting cage comprising a pair of spaced axially aligned discs, a pair of wiener engageable rods disposed inwardly of the peripheries of said discs in parallelism with the axes thereof and in spaced circumferential relation, the opposite ends of said rods being rigidly secured to said discs, a third wiener engageable rod disposed radially outwardly of said pair of rods circumferentially intermediate same, one end of said third rod having a pivotal connection with one of said discs, and yieldable means supported by the other disc and having a detachable connection with the other end of said third rod for normally holding same in parallelism with said pair of rods.

8. The structure according to claim 7, wherein said other disc is provided with a guide yoke on the outer face thereof, and said yieldable means comprising an elongated bar received within said yoke for movement radially of the disc, said bar being provided on its outer end with a hook removably engageable over said other end of said third rod, a nut adjustably engaged with the inner end of said bar and a coil spring disposed between said yoke and said nut for the purpose set forth.

9. A wiener supporting cage, comprising a pair of axially aligned rotatable discs, wiener engaging means rigid with said discs and supported inwardly of the peripheries thereof, and means for engaging and clamping wieners against said first means, said last means comprising a rod disposed adjacent the peripheries of said discs and having one end thereof pivotally secured to one of the discs, a retainer bar having a radial sliding engagement with the other disc, a hook on the outer end of said bar having a releasable engagement with the other end of said rod, and yieldable means engaged with said bar for normally urging same inwardly to effect a clamping action on the wieners.

References Cited in the file of this patent
UNITED STATES PATENTS

| | | |
|---|---|---|
| 1,093,883 | Raillere | Apr. 21, 1914 |
| 2,046,352 | Warner | July 7, 1936 |
| 2,408,935 | Kunst | Oct. 8, 1946 |
| 2,467,480 | Hudson | Apr. 19, 1949 |
| 2,545,818 | Larkin | Mar. 20, 1951 |
| 2,638,841 | Boyce | May 19, 1953 |
| 2,649,852 | McCandless | Aug. 25, 1953 |